(12) United States Patent
Rodriguez

(10) Patent No.: US 11,032,356 B2
(45) Date of Patent: *Jun. 8, 2021

(54) GROUPWARE MANAGEMENT

(71) Applicant: International Business Machines Corporation, Armonk, NY (US)

(72) Inventor: Jean-Michel Rodriguez, Mauguio (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/742,151

(22) Filed: Jan. 14, 2020

(65) Prior Publication Data

US 2020/0153892 A1 May 14, 2020

Related U.S. Application Data

(63) Continuation of application No. 14/465,901, filed on Aug. 22, 2014, now Pat. No. 10,594,775.

(30) Foreign Application Priority Data

Oct. 14, 2013 (GB) .................................. 1318102

(51) Int. Cl.
*H04L 29/08* (2006.01)
*G06Q 10/10* (2012.01)
(Continued)

(52) U.S. Cl.
CPC ............ *H04L 67/10* (2013.01); *G06F 3/0482* (2013.01); *G06F 3/04842* (2013.01);
(Continued)

(58) Field of Classification Search
None
See application file for complete search history.

(56) References Cited

U.S. PATENT DOCUMENTS 5,732,399 A 3/1998 Katiyar et al.
5,826,257 A 10/1998 Snelling, Jr.
(Continued)

FOREIGN PATENT DOCUMENTS

EP 2437209 4/2012
EP 1829412 2/2013
(Continued)

OTHER PUBLICATIONS

The University of Texas at Austin, Outlook 2007 (Windows): Adding/Removing Global Distribution List Members, Retrieved from internet Jul. 6, 2014, URL: http://www.utexas.edu/its/help/messaging/338, 1 page.

(Continued)

*Primary Examiner* — Arpan P. Savla
*Assistant Examiner* — Maria S Ayad
(74) *Attorney, Agent, or Firm* — Schmeiser, Olsen & Watts; Nicholas L. Cadmus (57) ABSTRACT

A method and associated system for using a graphical user interface (GUI) to add new members to groups associated with events. A calendar record window, including an updated list of members of a first group of members invited to a first event, is displayed. The updated list consists of a list of initial members of the first group invited to the first event and a new member of the first group. A first record including the initial members is updated to add the new member to the initial members on the first record. In response to updating the first record, a change control window, which provides a user with a capability to add the new member to other groups of members invited to respective other events, is displayed on the GUI simultaneous with displaying the updated calendar record window on the GUI.

18 Claims, 9 Drawing Sheets

(51) Int. Cl.
  *G06F 3/0484* (2013.01)
  *H04L 12/18* (2006.01)
  *G06F 3/0482* (2013.01)
(52) U.S. Cl.
  CPC ........... *G06Q 10/101* (2013.01); *H04L 12/18* (2013.01); *H04L 12/185* (2013.01)

(56) References Cited

U.S. PATENT DOCUMENTS

| | | | |
|---|---|---|---|
| 5,841,420 | A | 11/1998 | Kaply et al. |
| 7,706,825 | B2 | 8/2010 | Flora et al. |
| 7,953,786 | B2 | 5/2011 | Bassom et al. |
| 7,984,378 | B1 | 7/2011 | Atkins et al. |
| 8,943,140 | B1 * | 1/2015 | Kothari .............. G06Q 10/1095 709/204 |
| 2003/0233364 | A1 | 12/2003 | Nakao et al. |
| 2007/0256043 | A1 | 11/2007 | Peters et al. |
| 2008/0071868 | A1 | 3/2008 | Arenburg et al. |
| 2008/0189301 | A1 * | 8/2008 | Chen ....................... G06Q 10/10 |
| 2008/0191896 | A1 | 8/2008 | Jain et al. |
| 2011/0246581 | A1 | 10/2011 | Zhu et al. |
| 2013/0080534 | A1 | 3/2013 | Ogawa et al. |
| 2013/0090965 | A1 | 4/2013 | Rivere |
| 2013/0311598 | A1 | 11/2013 | Arrouye et al. |
| 2014/0207695 | A1 | 7/2014 | Beekman et al. |
| 2014/0372941 | A1 | 12/2014 | Parsons et al. |
| 2015/0106747 | A1 | 4/2015 | Rodriguez |

FOREIGN PATENT DOCUMENTS

| | | |
|---|---|---|
| JP | 2007228243 | 9/2007 |
| WO | WO02103570 | 12/2002 |

OTHER PUBLICATIONS

Vidya Madabushi, Adding or Removing Users in Groups, Retrieved from Internet Jul. 6, 2014, URL:https://confluence.atlassian.com/display/DOC/Adding+for+Removing+Users+in+Groups, 7 pages.

Office Action (dated May 23, 2017) for U.S. Appl. No. 14/465,901, filed Aug. 22, 2014.
Amendment (dated Aug. 23, 2017) for U.S. Appl. No. 14/465,901, filed Aug. 22, 2014.
Final Office Action (dated Nov. 16, 2017) for U.S. Appl. No. 14/465,901, filed Aug. 22, 2014.
Fianl amendment (dated Jan. 16, 2018) for U.S. Appl. No. 14/465,901, filed Aug. 22, 2014.
Advisory Action (dated Mar. 7, 2018) for U.S. Appl. No. 14/465,901, filed Aug. 22, 2014.
RCE (Apr. 9, 2018) for U.S. Appl. No. 14/465,901, filed Aug. 22, 2014.
Office Action (dated Jul. 9, 2018) for U.S. Appl. No. 14/465,901, filed Aug. 22, 2014.
Amendment (dated Oct. 9, 2018) for U.S. Appl. No. 14/465,901, filed Aug. 22, 2014.
Final Office Action (dated Nov. 16, 2018) for U.S. Appl. No. 14/465,901, filed Aug. 22, 2014.
Final amendment (dated Jan. 15, 2019) for U.S. Appl. No. 14/465,901, filed Aug. 22, 2014.
Advisory Action (dated Feb. 7, 2019) for U.S. Appl. No. 14/465,901, filed Aug. 22, 2014.
Ex Parte Quayle Office Action (dated May 31, 2019) for U.S. Appl. No. 14/465,901, filed Aug. 22, 2014.
Response to Ex Parte Quayle Office Action (dated Aug. 12, 2019) for U.S. Appl. No. 14/465,901, filed Aug. 22, 2014.
Notice of Allowance (dated Nov. 6, 2019) for U.S. Appl. No. 14/465,901, filed Aug. 22, 2014.
312 amendment (dated Jan. 3, 2020) for U.S. Appl. No. 14/465,901, filed Aug. 22, 2014.
https :1/web.archive. Org/web/20060629212543/http ://bubble .ro/Create_complete_Windows_XP disk_ with_ S P2_and_all_updates.html (Year 2006).

* cited by examiner

| Groupware GUI 400 | | | 402 − □ X |
|---|---|---|---|
| Toolbar 404 | View 404.1 | Edit 404.2 | Save 404.3 |

Events With Same Membership Window 422

| Event Date 422.1 | Event Name 422.2 | Event Members 422.3 | Update Members 422.4 |
|---|---|---|---|
| 9/4/2025 | Delta Group Anniversary | Andy; John; Dave | Yes |
| 10/4/2025 | Delta Status | Andy; John | No |
| 11/4/2026 | Delta Social | Andy; John | Yes/No |

GROUPWARE MANAGEMENT

GROUPWARE MANAGEMENT

This application is a continuation application claiming priority to Ser. No. 14/465,901, filed Aug. 22, 2014, now U.S. Pat. No. 10,594,775 issued Mar. 17, 2020.

TECHNICAL FIELD

The present invention relates generally to a method and apparatus for groupware management, and in particular to a method and apparatus for managing a database having a group of contacts associated with active data records such as: distribution lists; calendar records; and active task or project records.

BACKGROUND

Groupware refers to messaging and database systems that allow users to collaborate with each other using messages and the database. In groupware, certain records contain the underlining group members data. With the proliferation of groupware applications in an enterprise environment, the number of such records can become very large. The large number of records can make it difficult or impossible to keep all such records to update.

BRIEF SUMMARY

In a first aspect of the invention there is provided a system for managing a groupware system including a plurality of records associated with one or more groups of members, said system comprising: a listener for listening for or intercepting a change in members of a group comprising adding new members and/or removing old members; a search engine for locating records associated with the original group members; and a record modifier for updating the located records by adding the new members or removing the old members.

In a second aspect of the invention there is provided a method for managing a groupware system, said groupware system comprising a plurality of records associated with one or more groups of members, said method comprising: listening for or intercepting a change in members of a group comprising adding new members and/or removing old members; locating records associated with the original group members; and updating the located records by adding the new members or removing the old members.

Advantageously, the method further comprises presenting a user interface allowing user selection of all, some or no changes to be applied to located records. If some located records are selected then a further interface can be presented allowing user selection of some of the records.

More advantageously, the method further comprises presenting a user interface showing the located records and allowing user selection of the one or more of the located records for propagation of the changes.

Still more advantageously, the groupware system further comprises: a hierarchical group structure of related groups; The method further comprises listening for and intercepting a change in members of a super-group or sub-group; and propagating the change to records having related groups.

Yet more advantageously, the method further comprises notifying members of changes.

In one embodiment, the method further comprises indexing records by members. Such indexing allows much faster location of the relevant records associated with change in group membership.

In one embodiment, adding the new member or removing the old member comprises associating the record with the changed group.

In one embodiment, the method further comprises intercepting or listening for a change in an individual group associated with an individual record and determining whether to propagate that change to other records.

The embodiments have a consolidating effect on externally stored groupware information since an independent groupware system will run more efficiently with up-to-date information. The embodiments can operate at system level of a computer if no user interaction is required. The embodiments results in groupware system operating in a new and efficient way.

In a third aspect of the invention there is provided a computer program product for managing groupware, the computer program product comprising a computer-readable storage medium having computer-readable program code embodied therewith and the computer-readable program code configured to perform all the steps of the methods.

The computer program product comprises a series of computer-readable instructions fixed on a tangible medium, such as a computer-readable medium, for example, optical disk, magnetic disk, solid-state drive. The series of computer-readable, instructions embodies all or part of the functionality previously described.

Those skilled in the art will appreciate that such computer-readable instructions can be written in a number of programming languages for use with many computer architectures or operating systems. Further, such instructions may be stored using any memory technology, present or future, including but not limited to, semiconductor, magnetic, or optical. It is contemplated that such a computer program product may be distributed as a removable medium with accompanying printed or electronic documentation, for example, shrink-wrapped software, pre-loaded with a computer system, for example, on a system ROM or fixed disk.

In a fourth aspect of the invention there is provided a computer-program stored on a computer readable medium and loadable into the internal memory of a digital computer, comprising software code portions, when said program is run on a computer, for performing all the steps of the method claims.

In a fifth aspect of the invention there is provided a data carrier aspect of the invention that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

DETAILED DESCRIPTION

Figure 1:
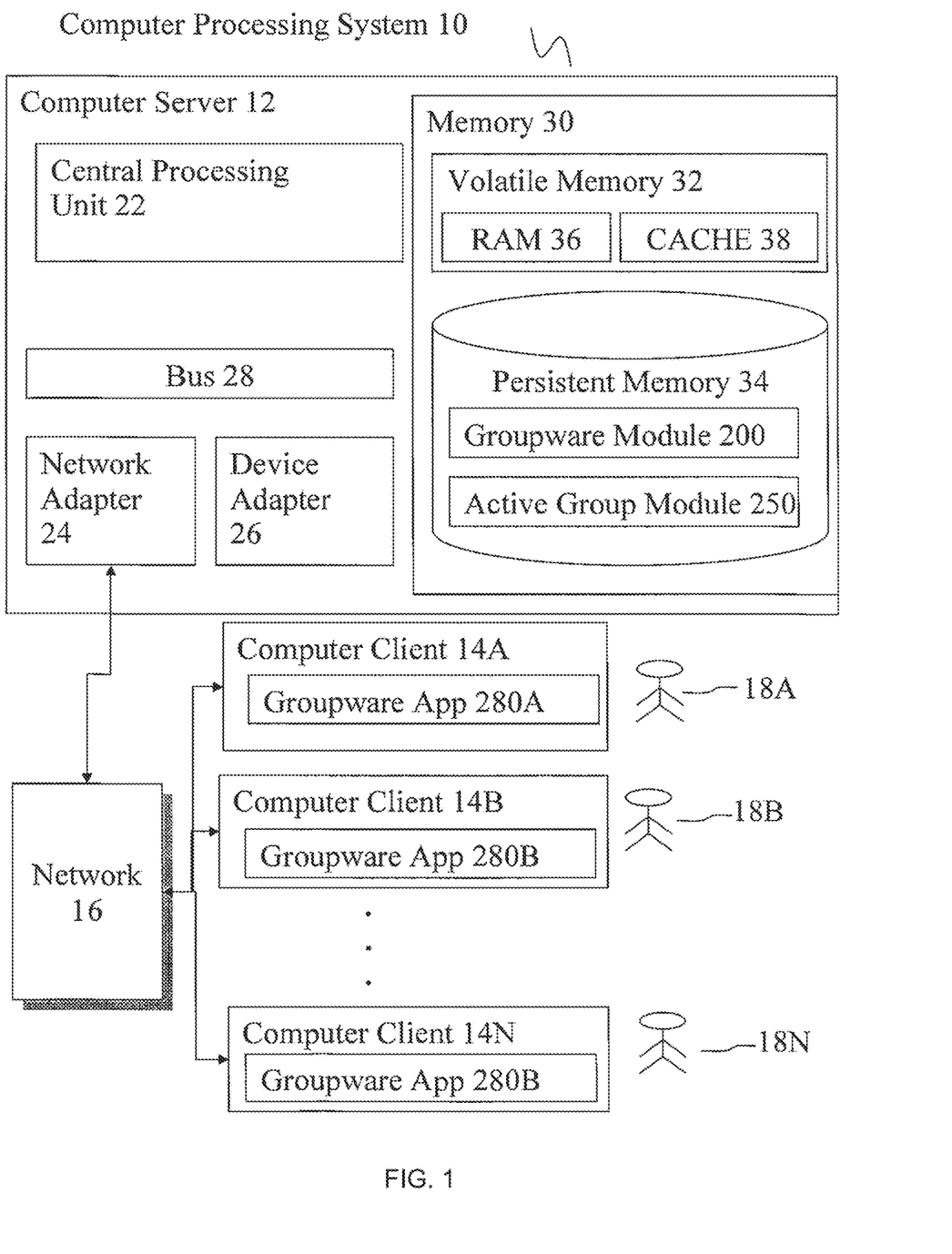
FIG. 1 is a deployment diagram, in accordance with embodiments of the present invention.

FIG. 1 depicts the deployment of a computer processing system 10, in accordance with embodiments of the present invention. Computer processing system 10 is operational with numerous other general-purpose or special-purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: computer server 12 and one or more client devices 14A to 14N coupled to the computer server 12 via network 16. Computer client devices 14A to 14N communicate with respective user 18A to 18N using input devices and output devices (not shown). Input devices include one or more of: a keyboard, a scanner, a mouse, trackball or another pointing device. Output devices include one or more of a display or a printer. Network 16 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in register (not shown); transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 16 for enabling communication between the computer server 12 and network devices.

Device adapter 26 is connected to bus 28 for enabling communication between the computer server 12 and devices other than network devices.

Bus 28 couples the main system components together including memory 30 to central processor unit (CPU) 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product comprising a computer-readable storage device (e.g., persistent memory 34), wherein the storage device includes program code such as a set (for example, at least one) of program modules that are configured to carry out the functions of embodiments of the invention upon being executed by a processor (e.g., CPU 22) via the memory 32. Generally, a computer system of the present invention comprises one or more processors (e.g., CPU 22), one or more computer-readable storage devices (e.g., persistent memory 34), one or more memories (e.g., memory 32), wherein the one or more storage devices comprise computer code, which upon being executed by the one or more processors via the one or more memories, perform the methods of the present invention.

The set of program modules configured to carry out the functions of the invention comprises groupware module 200 and active group module 250, both included in persistent memory 34. Further program modules that support embodiments of the present invention, but are not shown in FIG. 1, include firmware, boot strap program, operating system, and support applications. Each of the operating system, support applications, other program modules, and program data or some combination thereof, may include an implementation of a networking environment.

Computer processing system 10 communicates with at least one network 16 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Groupware module 200 running on the computer server 12 interacts with groupware apps 280A to 280N running on the computer clients to form the groupware system. In one embodiment, the groupware system functions as a calendaring system for users 18A to 18N whereby one user creates a calendar record and invites one or more other users to form a group for that calendar record. In one embodiment, a single calendar record with an associated group can be formed for the whole groupware application. In one embodiment, individual calendar records and associated groups are created for each member of the group for that calendar record. In these embodiments the individual records are stored in the server and groupware apps 280A to 280N are Web browser based for receiving the data output. In a further alternative embodiment groupware client applications are custom designed applications that receive data output for optimized input and output. Calendaring records are just one example of a groupware record. Group tasks, distribution list, and access control are other examples. However, any record associated with a group of members can benefit from the embodiments.

Figure 5:
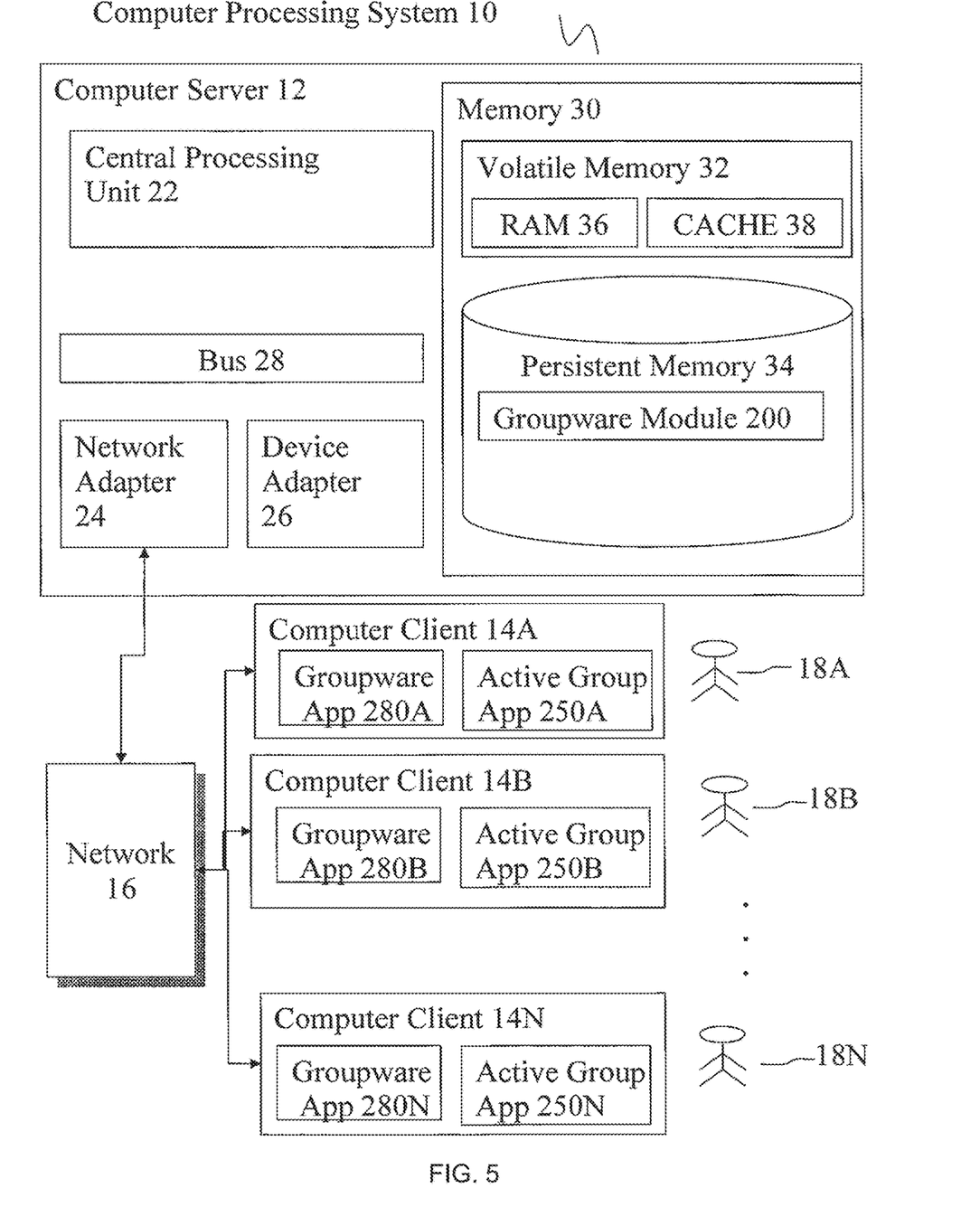
FIG. 5 is a deployment diagram of a client-based embodiment of the present invention.

In an alternative embodiment shown in FIG. 5 individual calendar records are stored on a computer-readable storage device of a local client device and replicated with a server typically for client-based groupware applications like Lotus Notes. Individual active group applications 250A to 250N are installed on one or more computer-readable storage devices of respective client devices. Lotus Notes is a trademark or registered trademark in the US and/or other countries of International Business Machines Corporation.

Active group module 250 runs on computer server 12 in one embodiment and provides the solution of the embodiment.

Figure 2A:
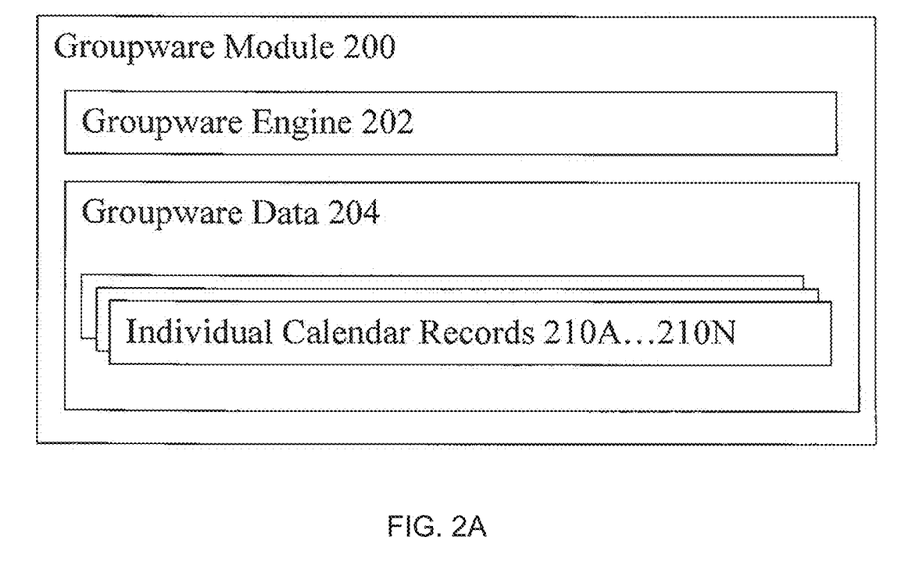
FIGS. 2A and 2B are component diagrams, in accordance with embodiments of the present invention.

Referring to FIG. 2A, groupware module 200 comprises the following components: groupware engine 202; and groupware data 204, in accordance with embodiments of the present invention.

Groupware engine 202 provides the core functionality of the groupware program that acts on the groupware data 204.

Groupware data 204 comprises sets of calendar records 210A to 210N for each respective user. Each set of calendar records contains one or more individual calendar records. In one embodiment, an event will generate a calendar record for each user invited to that event whereby the data is synchronized initially but can be individually amended by respective users. With the groupware engine 202, if a user amends an event, then that event update is propagated to all the records of that event—and this applies to members data too. However, it is the propagation of membership updates to other records that the active group module 250 is concerned with.

Figure 2B:
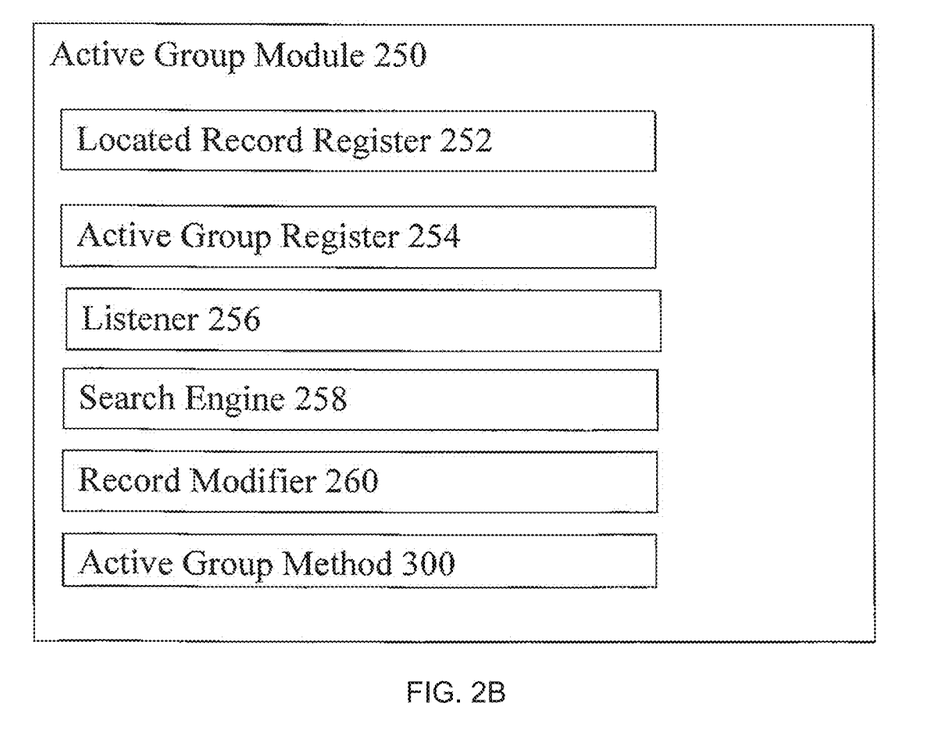

Referring to FIG. 2B, active group module 250 comprises the following components: located record register 252; active group register 254; listener 256; search engine 258; record modifier 260 and active group method 300, in accordance with embodiments of the present invention.

Located record register 252 is for storing references to records that are located as containing the original members for the group.

Active group register 254 is for storing the original members of the changed group.

Listener 256 is for listening for or intercepting a change in members of a group comprising adding new members and/or removing old members.

Search engine 258 is for locating records associated with the original group members.

Record modifier 260 is for updating the located records by adding the new members or removing the old members.

Active group method 300 is for propagating a group member change in one record to one or more other records.

Figure 3:
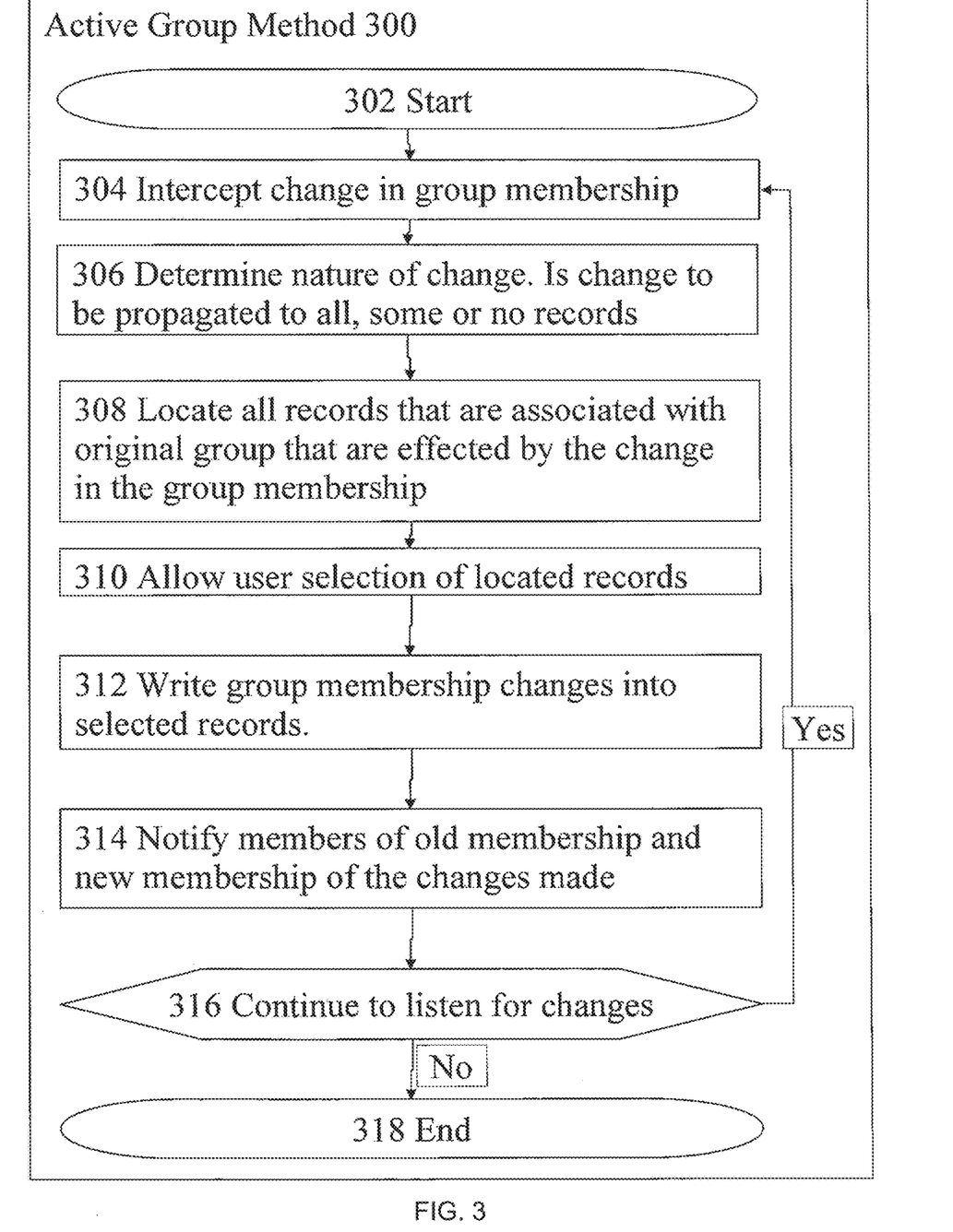
FIG. 3 is a flow chart of an active group method for managing a groupware system that comprises a plurality of records associated with one or more groups of members, in accordance with embodiments of the present invention.

FIG. 3 is a flow chart of an active group method 300 for managing a groupware system that comprises a plurality of records associated with one or more groups of members, in accordance with embodiments of the present invention. The method 300 comprises logical process steps 302 to 318.

Step 302 is the start of active group method 300.

Step 304 is for intercepting a change in group membership for a record. Typically this involves intercepting or listening for a change in an individual group associated with an individual record. In one embodiment the change in the individual group occurs in the server in any one of the calendar records. In another embodiment a super class of group representing every occurrence of that combination of members would exist and be updated by an administrator This super class would represent all occurrences of that group in all the records and not just a single occurrence. This type of super class would be typical of a groupware global member list where corporate structure and management groups can be defined. Such an embodiment could comprise: a hierarchical group structure of related groups; listening for and intercepting a change in members of a super-group or sub-group; and propagating the change to records having related groups.

Step 306 is for determining the nature of the change. For instance, whether the change to be propagated to all, some or no records. In one embodiment, a user interface is presented allowing user selection of all, some or no changes to be applied to located records. If some located records are chosen, then a further interface can be presented allowing a user selection of some of the records. In another embodiment, such a determination can be controlled depending on the type of change.

Step 308 is for locating all records that are associated with an original group that is affected by the change in the group membership. In one embodiment, a search is performed on demand. In a further embodiment, prior searching is performed by indexing records according to the members. Such an embodiment provides faster location of the relevant records associated with change in group membership.

Step 310 is for allowing user selection of located records. A user interface is presented showing the located records and allowing user selection of one or more of the located records for propagation of the changes. Another embodiment would suggest a selection or make a selection based on selection history or another criteria.

Step 312 is for writing group membership changes into selected records. In one embodiment, hard member data is written into each selected record. In an alternative embodiment, adding the new member or removing the old member comprises associating the record with the changed group, for instance by using a reference to group data rather than the group data directly.

Step 314 is for notifying old members and new members of the changes made. This step is an advantageous optional feature.

Step 316 is for continuing to listen for changes and returning to step 304; otherwise, step 318 is performed.

Step 318 is the end of active group method 300.

FIGS. 4A to 4D are example screen shots showing final state of a groupware graphical user interface (GUI) 400 and calendar records, in accordance with embodiments of the present invention. GUI 400 comprises: window control 402; toolbar 404; and calendar record window 412.

Figure 4A:
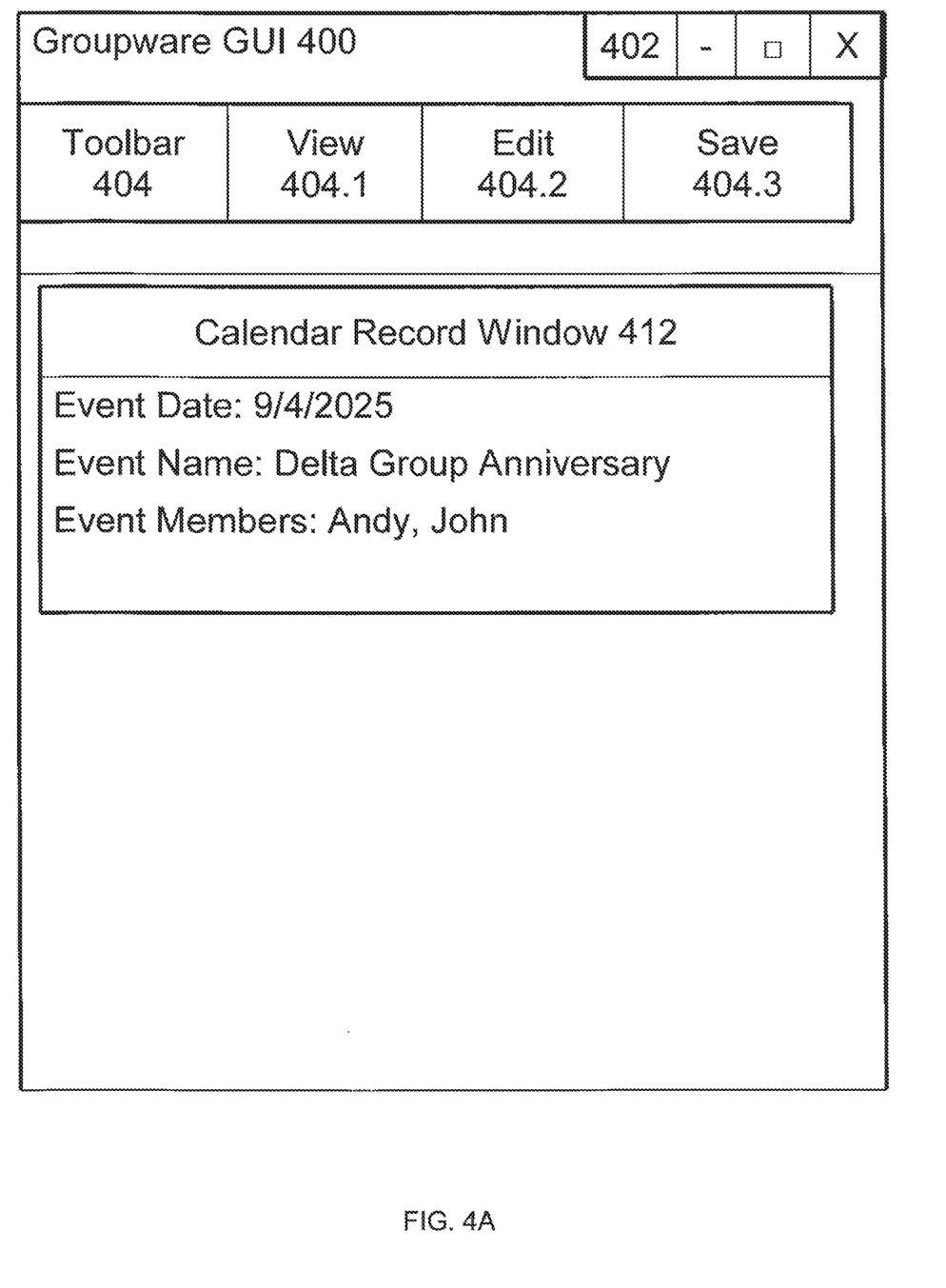
FIGS. 4A to 4D are example screens showing final state of a graphical user interface (GUI) 400, in accordance with embodiments of the present invention.

Window control 402 provides for minimizing; maximizing and closing of the GUI 400.

Toolbar 404 provides the following controls: view 404.1; edit 404.2; and save 404.3.

View 404.1 is a control for viewing the calendar records. In FIG. 4A a user has selected view 404.1 and a calendar record window is displayed.

Edit 404.2 is a control for editing a calendar record.

Save 404.3 is a control for saving a calendar record.

In FIG. 4A, calendar record window 412 is a single record format displaying event date (Sep. 4, 2025); event name (Delta Group Anniversary); and event members (Andy; John).

Figure 4B:
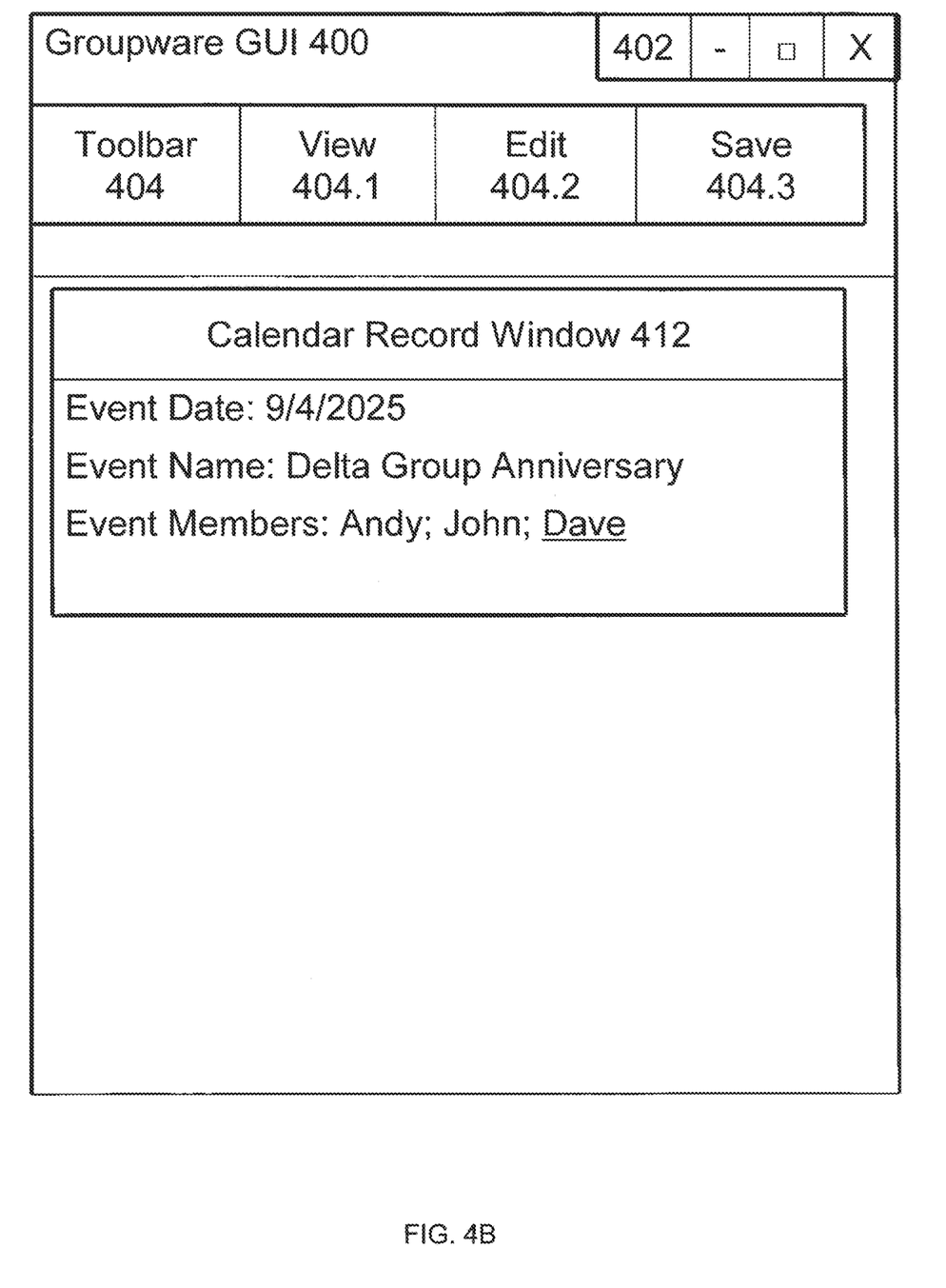

FIG. 4B shows calendar record window 412 displaying the same record as in FIG. 4A after a user has edited (after selecting edit 404.2) and added Dave (underlined) to the event members list.

Figure 4C:
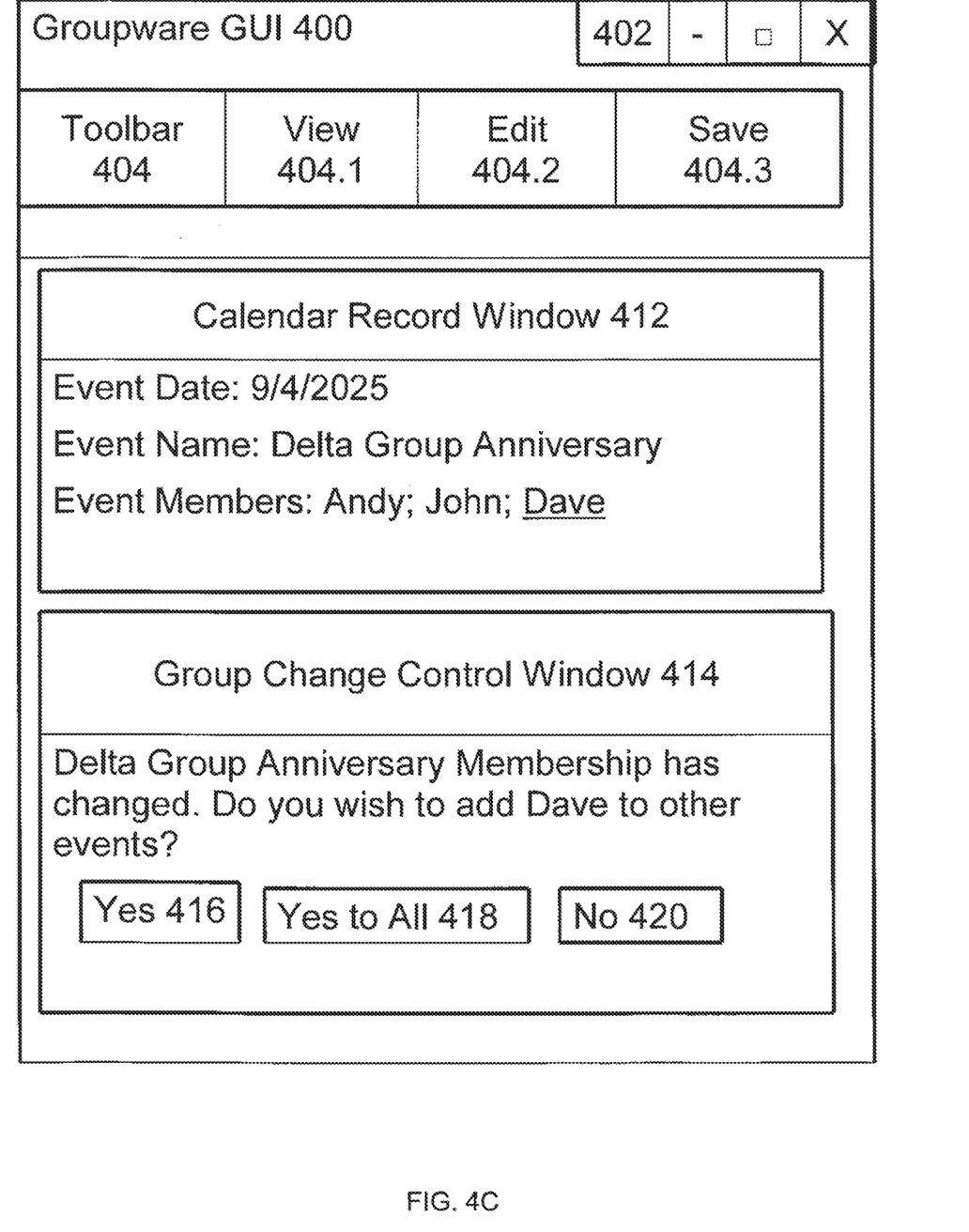

FIG. 4C shows, that in response to the change depicted in FIG. 4B, a new window is displayed: group change control window 414. Group change control window 414 confirms to the user that a group has been changed. In this case, it is confirmed that the group associated with "Delta Group Anniversary" has been changed. Group change control window 414 asks the user if Dave should be added to other events and presents the user with control buttons: yes 416; yes to all 418; and no 420.

Figure 4D:
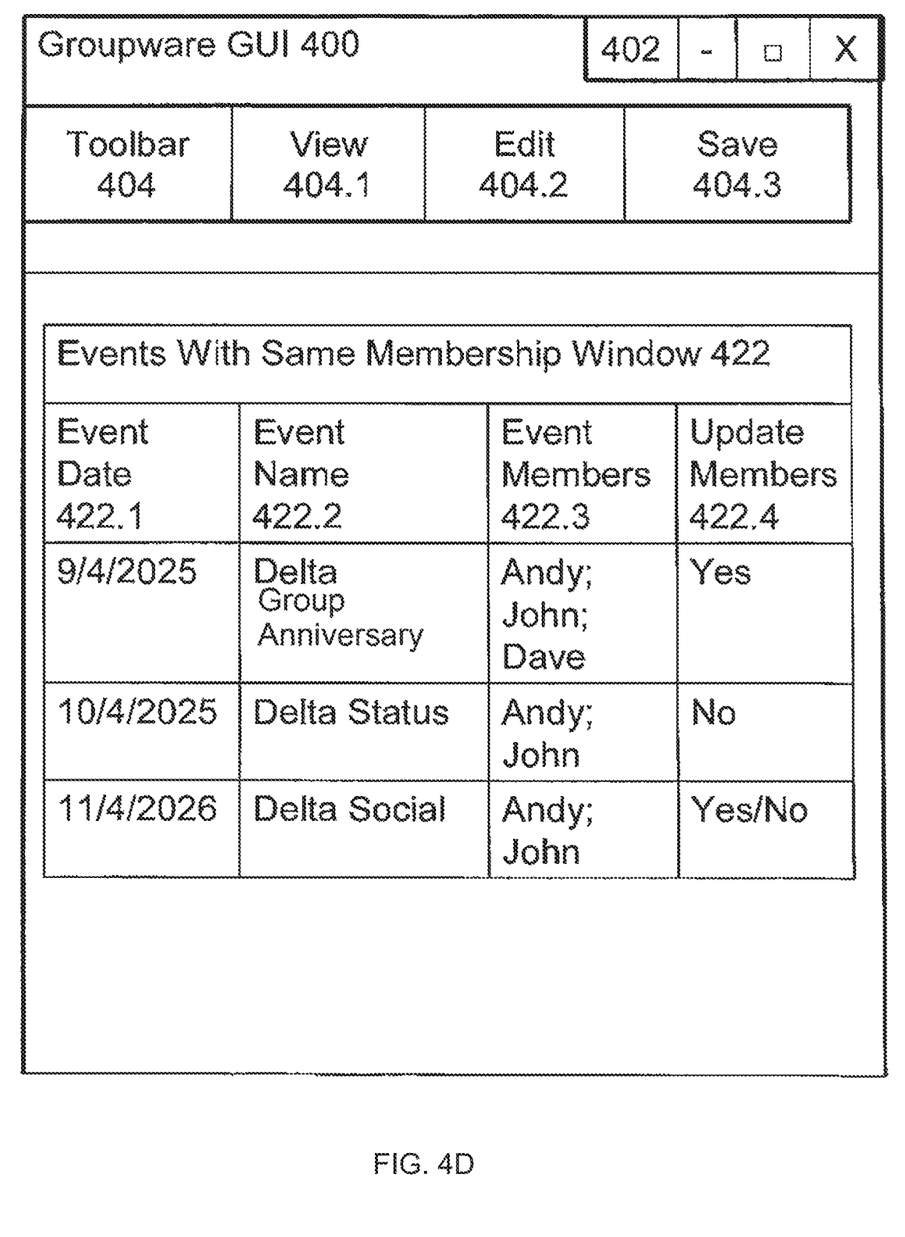

FIG. 4D shows the example when a user selects yes 416. Events with same membership window 422 is displayed showing events (event date 422.1, event name 422.2 and event member 422.3 columns) with the same membership. A further column, update members 422.4, contains a switch control that can be selected "Yes" or "No" or remain unselected "Yes/No". In this case: the event "Delta Group Anniversary" has been updated already (Yes) because it was the original record to be updated; event "Delta Status" has not been updated (No) (i.e., Dave has not been added to the "Delta Status" event); and event "Delta Social" remains unselected (Yes/No) with respect to adding Dave. Once the user has selected Yes and then save 404.3, the updates to members are written to the respective records.

Figure 6:
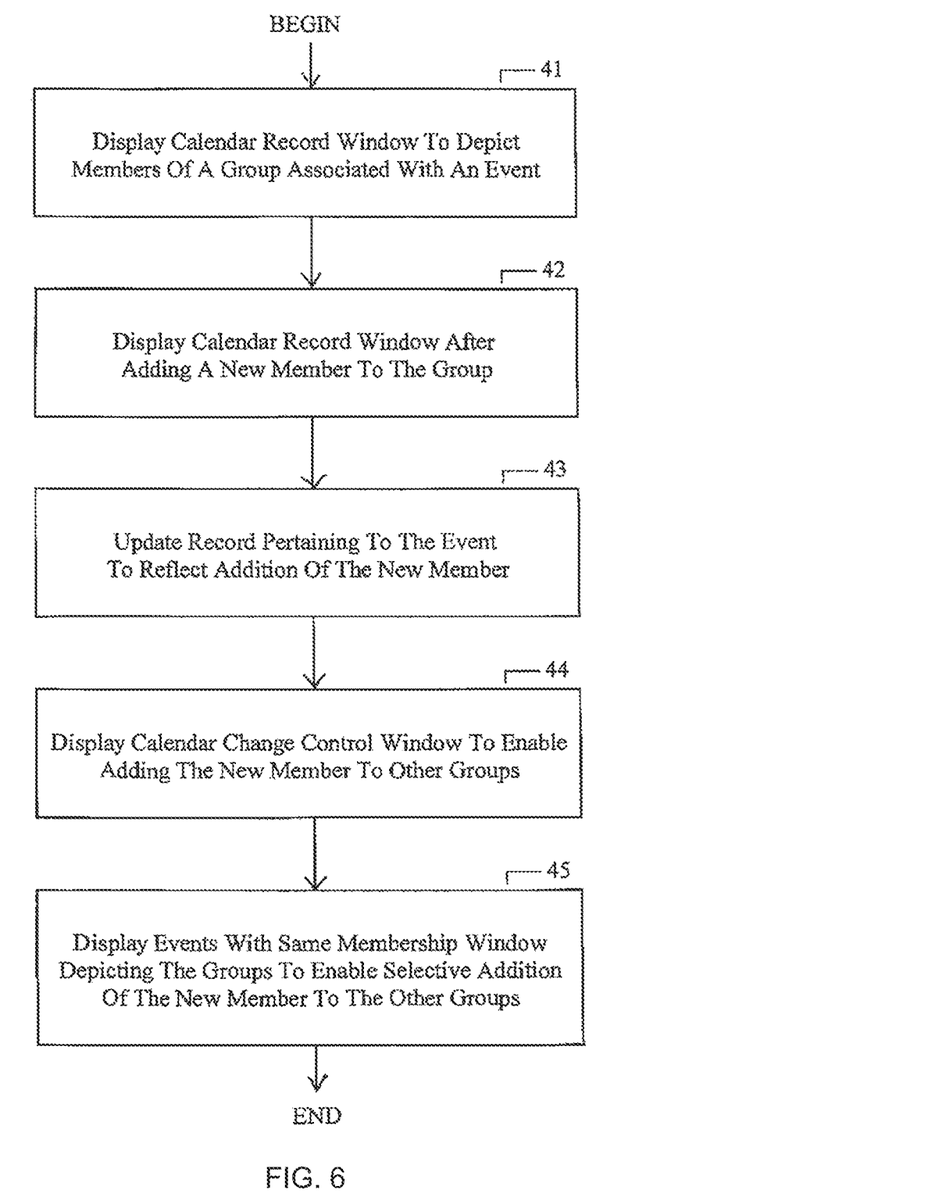
FIG. 6 is a flow chart describing a method for managing groups associated with events, in accordance with embodiments of the present invention.

FIG. 6 is a flow chart describing a method for managing groups associated with events, in accordance with embodiments of the present invention. The method of FIG. 6 is illustrated in the embodiments of the present invention depicted in FIGS. 4A-4D and comprises steps 41-45.

In step 41, a calendar record window (412 in FIG. 4A) pertains to a first event ("Delta Group Anniversary" in FIG. 4A) is displayed on a GUI (400 in FIG. 4A) and depicts a date of the first event, a name of the first event, and the initial members of a first group invited to the first event.

In step 42, the calendar record window is updated, and displayed on the GUI, to identify a new member (Dave in FIG. 4B) to the first group. The updated calendar record window comprises the date of the first event, the name of the first event, and the initial members and the new member of the first group.

In step 43, a first record stored on one or more computer-readable data storage devices is updated. The first record comprises information pertaining to the first event. The information pertaining to the first event comprises the list of initial members of the first group of members invited to the first event. Updating the first record comprises adding a new member to the first group which results in the first group in the first record including the new member in addition to the initial members.

In step 44, in response to updating the first record in step 43, a change control window (414 in FIG. 4C) is displayed on the GUI. The change control window queries a user to select whether or not to be provided with a capability to add the new member to one or more other groups of members invited to respective one or more other events. Each group of the one or more other groups comprise a respective list of members that include the initial members of the first group. In one embodiment, the one or more other groups comprise a plurality of groups. The one or more other events comprise a plurality of events to which the members of the plurality of groups are respectively invited. In the change control window, the capability to add the new member includes a first option to add the new member selectively to each group of the plurality of groups, a second option to add the new member to all groups of the plurality of groups, and a third option to not add the new member to any group of the plurality of groups.

In step 45, an events with same membership window (422 in FIG. 4D) queries the user to specify whether or not to add the new member selectively to each group of the plurality of groups.

Further embodiments of the invention are now described. It will be clear to one of ordinary skill in the art that all or part of the logical process steps may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of embodiments of the present invention may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the present invention may alternatively be embodied fully or partially in a parallel computing system comprising two or more processors for executing parallel software.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for using a graphical user interface (GUI) to add new members to groups associated with events, said method comprising:
    displaying on the GUI, by one or more processors of a computer system, a calendar record window comprising an updated list of members of a first group of members invited to a first event, said updated list consisting of a list of initial members of the first group invited to the first event and a new member of the first group;
    said one or more processors updating a first record including the initial members to add the new member to the initial members on the first record;
    in response to said updating the first record, said one or more processors displaying on the GUI, simultaneous with said displaying the updated calendar record window on the GUI, a change control window which provides a user with a capability to add the new member to a plurality of other groups of members invited to respective other events, wherein each group of the plurality of other groups comprise a respective list of members that include the initial members of the first group, wherein the members of the first group, the members of the plurality of other groups, and the new member are people, wherein the capability to add the new member includes a first option to add the new member selectively to each group of the plurality of groups for events having a same membership (Yes option), a second option to add the new member to all groups of the plurality of groups (Yes to All option), and a third option to not add the new member to any group of the plurality of groups (No option), and wherein a totality of different selectable options in the change control window displayed on the GUI consists of the first option, the second option, and the third option, said updated calendar record window and said change control window being displayed simultaneously in non-overlapping portions of the GUI, wherein the YES option, the YES to ALL option, and the NO option are individually selectable by the user in respective different areas within the change control window, and wherein the change control window displays text communicating that a membership of the first group of members has changed and displays a query as to whether the new member is to be added to other events; and
    receiving from the user, by the one or more processors, a selection of the first option, a selection of the second option, or a selection of the third option.

2. The method of claim 1, wherein the new member is displayed, on the updated list, with visual emphasis in comparison with the display of the initial members on the updated list.

3. The method of claim 1, wherein the method further comprises:
    after said displaying the change control window, said one or more processors receiving a selection by the user of the first option and in response, said one or more processors displaying events with a same membership window which queries the user to specify whether or not to add the new member selectively to each group for events having the same membership.

4. The method of claim 3, wherein the events with the same membership window comprise a table, wherein the table comprises a row specific to the first event and a row specific to each event having the same membership, a first column for identifying a date of each event, a second column for identifying a name of each event, a third column for identifying the members invited to each event, and a fourth column for enabling the user to select whether or not to add the new member to the group invited to each event, wherein the cell in each row in the fourth column below a header row of the table includes text selected from the group consisting of Yes text denoting that the user selected to add the new member to the group invited to the event whose name appears in the same row in the second column, No text denoting that the user selected not to add the new member to the group invited to each event whose name appears in the same row in the second column, and Yes/No text denoting that the user has not selected whether or not to add the new member to the group invited to each event whose name appears in the same row in the second column, and wherein the cells in the fourth column comprise a first cell including said Yes text, a second cell including said No text, and a third cell including said Yes/No text.

5. The method of claim 3, wherein the method further comprises:
   after said displaying the events with the same membership window, said one or more processors receiving a specification by the user to add the new member to at least one group for events having the same membership; and
   in response to said receiving the specification to add the new member to the at least one group, said one or more processors updating at least one record on the one or more data storage devices, wherein the at least one record comprises information respectively pertaining to at least one event having the same membership, wherein said updating the at least one record comprises adding the new member to the at least one group which results in the at least one group in the at least one record including the new member in addition to the initial members.

6. The method of claim 5, wherein the method further comprises:
   after said updating the at least one record, said one or more processors notifying each member of the initial members that the new member has been added to the first group and to the at least one group.

7. A computer program product, comprising a one or more computer-readable hardware storage devices having computer-readable program code stored therein, said one or more computer-readable hardware storage devices being one or more data carriers and not including a signal for the transmission of data, said program code containing instructions which, upon being executed by one or more processors of a computer system, implement a method for using a graphical user interface (GUI) to add new members to groups associated with events, said method comprising:
   said one or more processors displaying, on the GUI, a calendar record window comprising an updated list of members of a first group of members invited to a first event, said updated list consisting of a list of initial members of the first group invited to the first event and a new member of the first group list;
   said one or more processors updating a first record including the initial members to add the new member to the initial members on the first record;
   in response to said updating the first record, said one or more processors displaying on the GUI, simultaneous with said displaying the updated calendar record window on the GUI, a change control window which provides a user with a capability to add the new member to a plurality of other groups of members invited to respective other events, wherein each group of the plurality of other groups comprise a respective list of members that include the initial members of the first group, wherein the members of the first group, the members of the plurality of other groups, and the new member are people, wherein the capability to add the new member includes a first option to add the new member selectively to each group of the plurality of groups for events having a same membership (Yes option), a second option to add the new member to all groups of the plurality of groups (Yes to All option), and a third option to not add the new member to any group of the plurality of groups (No option), and wherein a totality of different selectable options in the change control window displayed on the GUI consists of the first option, the second option, and the third option, said updated calendar record window and said change control window being displayed simultaneously in non-overlapping portions of the GUI, wherein the YES option, the YES to ALL option, and the NO option are individually selectable by the user in respective different areas within the change control window, and wherein the change control window displays text communicating that a membership of the first group of members has changed and displays a query as to whether the new member is to be added to other events; and
   receiving from the user, by the one or more processors, a selection of the first option, a selection of the second option, or a selection of the third option.

8. The computer program product of claim 7, wherein the new member is displayed, on the updated list, with visual emphasis in comparison with the display of the initial members on the updated list.

9. The computer program product of claim 7, wherein the method further comprises:
   after said displaying the change control window, said one or more processors receiving a selection by the user of the first option and in response, said one or more processors displaying events with a same membership window which queries the user to specify whether or not to add the new member selectively to each group for events having the same membership.

10. The computer program product of claim 9, wherein the events with the same membership window comprise a table, wherein the table comprises a row specific to the first event and a row specific to each event having the same membership, a first column for identifying a date of each event, a second column for identifying a name of each event, a third column for identifying the members invited to each event, and a fourth column for enabling the user to select whether or not to add the new member to the group invited to each event, wherein the cell in each row in the fourth column below a header row of the table includes text selected from the group consisting of Yes text denoting that the user selected to add the new member to the group invited to the event whose name appears in the same row in the second column, No text denoting that the user selected not to add the new member to the group invited to each event whose name appears in the same row in the second column, and Yes/No text denoting that the user has not selected whether or not to add the new member to the group invited to each event whose name appears in the same row in the second column, and wherein the cells in the fourth column comprise a first cell including said Yes text, a second cell including said No text, and a third cell including said Yes/No text.

11. The computer program product of claim 9, wherein the method further comprises:
   after said displaying the events with the same membership window, said one or more processors receiving a specification by the user to add the new member to at least one group for events having the same membership; and
   in response to said receiving the specification to add the new member to the at least one group, said one or more processors updating at least one record on the one or more data storage devices, wherein the at least one record comprises information respectively pertaining to at least one event having the same membership, wherein said updating the at least one record comprises adding the new member to the at least one group which results in the at least one group in the at least one record including the new member in addition to the initial members.

12. The computer program product of claim 11, wherein the method further comprises:
after said updating the at least one record, said one or more processors notifying each member of the initial members that the new member has been added to the first group and to the at least one group.

13. A computer system comprising one or more processors, one or more memories, and one or more computer-readable storage devices, said one or more computer-readable storage devices containing program code which, upon being executed by the one or more processors via the one or more memories, implements a method for using a graphical user interface (GUI) to add new members to groups associated with events, said method comprising:
said one or more processors displaying, on the GUI, a calendar record window comprising an updated list of members of a first group of members invited to a first event, said updated list consisting of a list of initial members of the first group invited to the first event and a new member of the first group list;
said one or more processors updating a first record including the initial members to add the new member to the initial members on the first record;
in response to said updating the first record, said one or more processors displaying on the GUI, simultaneous with said displaying the updated calendar record window on the GUI, a change control window which provides a user with a capability to add the new member to a plurality of other groups of members invited to respective other events, wherein each group of the plurality of other groups comprise a respective list of members that include the initial members of the first group, wherein the members of the first group, the members of the plurality of other groups, and the new member are people, wherein the capability to add the new member includes a first option to add the new member selectively to each group of the plurality of groups for events having a same membership (Yes option), a second option to add the new member to all groups of the plurality of groups (Yes to All option), and a third option to not add the new member to any group of the plurality of groups (No option), and wherein a totality of different selectable options in the change control window displayed on the GUI consists of the first option, the second option, and the third option, said updated calendar record window and said change control window being displayed simultaneously in non-overlapping portions of the GUI, wherein the YES option, the YES to ALL option, and the NO option are individually selectable by the user in respective different areas within the change control window, and wherein the change control window displays text communicating that a membership of the first group of members has changed and displays a query as to whether the new member is to be added to other events; and receiving from the user, by the one or more processors, a selection of the first option, a selection of the second option, or a selection of the third option.

14. The computer of claim 13, wherein the new member is displayed, on the updated list, with visual emphasis in comparison with the display of the initial members on the updated list.

15. The computer system of claim 13, wherein the method further comprises:
after said displaying the change control window, said one or more processors receiving a selection by the user of the first option and in response, said one or more processors displaying events with the a same membership window which queries the user to specify whether or not to add the new member selectively to each group for events having the same membership.

16. The computer system of claim 15, wherein the events with the same membership window comprise a table, wherein the table comprises a row specific to the first event and a row specific to each event having the same membership, a first column for identifying a date of each event, a second column for identifying a name of each event, a third column for identifying the members invited to each event, and a fourth column for enabling the user to select whether or not to add the new member to the group invited to each event, wherein the cell in each row in the fourth column below a header row of the table includes text selected from the group consisting of Yes text denoting that the user selected to add the new member to the group invited to the event whose name appears in the same row in the second column, No text denoting that the user selected not to add the new member to the group invited to each event whose name appears in the same row in the second column, and Yes/No text denoting that the user has not selected whether or not to add the new member to the group invited to each event whose name appears in the same row in the second column, and wherein the cells in the fourth column comprise a first cell including said Yes text, a second cell including said No text, and a third cell including said Yes/No text.

17. The computer system of claim 15, wherein the method further comprises:
after said displaying the events with the same membership window, said one or more processors receiving a specification by the user to add the new member to at least one group for events having the same membership; and
in response to said receiving the specification to add the new member to the at least one group, said one or more processors updating at least one record on the one or more data storage devices, wherein the at least one record comprises information respectively pertaining to at least one event having the same membership, wherein said updating the at least one record comprises adding the new member to the at least one group which results in the at least one group in the at least one record including the new member in addition to the initial members.

18. The computer system of claim 17, wherein the method further comprises:
after said updating the at least one record, said one or more processors notifying each member of the initial members that the new member has been added to the first group and to the at least one group.

* * * * *